(12) United States Patent
Hilton et al.

(10) Patent No.: US 9,565,089 B2
(45) Date of Patent: Feb. 7, 2017

(54) MAINTAINING INFORMATION INTEGRITY WHILE MINIMIZING NETWORK UTILIZATION OF ACCUMULATED DATA IN A DISTRIBUTED NETWORK

(71) Applicant: OutSmart Power Systems, LLC, Natick, MA (US)

(72) Inventors: Paul C. M. Hilton, Millis, MA (US); Jeffrey A. Mehlman, Sharon, MA (US); Thomas E. Armstrong, Northbridge, MA (US)

(73) Assignee: Outsmart Power Systems, LLC, Natick, MA (US)

( * ) Notice: Subject to any disclaimer, the term of this patent is extended or adjusted under 35 U.S.C. 154(b) by 0 days.

(21) Appl. No.: 13/891,675

(22) Filed: May 10, 2013

(65) Prior Publication Data
US 2014/0115152 A1 Apr. 24, 2014

Related U.S. Application Data

(63) Continuation of application No. PCT/US2011/060658, filed on Nov. 14, 2011.
(Continued)

(51) Int. Cl.
*G06F 15/173* (2006.01)
*H04L 12/26* (2006.01)
(Continued)

(52) U.S. Cl.
CPC .......... *H04L 43/0876* (2013.01); *G06Q 10/06* (2013.01); *H04L 12/2823* (2013.01)

(58) Field of Classification Search
CPC .. H04L 12/2823; H04L 43/0876; G06Q 10/06
(Continued)

(56) References Cited

U.S. PATENT DOCUMENTS 3,739,226 A 6/1973 Seiter et al.
4,002,951 A 1/1977 Halbeck
(Continued)

FOREIGN PATENT DOCUMENTS

JP 2003259569 9/2003
JP 2004064136 2/2004
(Continued)

OTHER PUBLICATIONS

Extended European Search Report dated Jun. 15, 2015 (Jun. 15, 2015) issued in related European Patent Application No. 11840249.4.
(Continued)

*Primary Examiner* — Quang N Nguyen
(74) *Attorney, Agent, or Firm* — Grossman, Tucker, Perreault & Pfleger, PLLC (57) ABSTRACT

A method and systems for gathering information regarding usage of a resource from at least one of a plurality of measuring nodes operatively coupled to a controller, wherein the measuring node includes at least one sensor and a node processor operatively coupled to the sensor, and the controller includes a controller processor. The method includes predicting an estimated resource usage value associated with the at least one sensor with the node processor and separately with the controller each using a predictor algorithm and dataset. The method further includes measuring resource usage to which the estimated resource usage value applies with the sensor and calculating a difference between the estimated resource usage value and the measured resource usage with the node processor. If the difference falls outside of a bound the measured resource usage is communicated to the controller.

20 Claims, 4 Drawing Sheets

Related U.S. Application Data (60) Provisional application No. 61/413,134, filed on Nov. 12, 2010.

(51) Int. Cl.
 *G06Q 10/06* (2012.01)
 *H04L 12/28* (2006.01)

(58) Field of Classification Search
 USPC .............. 700/268; 702/45, 61, 179; 705/412
 See application file for complete search history.

(56) References Cited

U.S. PATENT DOCUMENTS

| | | |
|---|---|---|
| 4,059,843 A | 11/1977 | Girismen |
| 4,121,152 A | 10/1978 | Hale et al. |
| 4,491,785 A | 1/1985 | Pecukonis |
| 4,636,914 A | 1/1987 | Belli |
| 4,755,913 A | 7/1988 | Sleveland |
| 4,871,924 A | 10/1989 | Sellati |
| 5,029,037 A | 7/1991 | Bartelink |
| 5,153,816 A | 10/1992 | Griffin |
| 5,365,154 A | 11/1994 | Schneider et al. |
| 5,424,894 A | 6/1995 | Briscall et al. |
| 5,485,356 A | 1/1996 | Nguyen |
| 5,568,399 A | 10/1996 | Sumic |
| 5,660,459 A | 8/1997 | Appelberg |
| 5,670,776 A | 9/1997 | Rothbaum |
| 5,684,469 A | 11/1997 | Toms |
| 5,833,350 A | 11/1998 | Moreland |
| 5,838,226 A | 11/1998 | Houggy et al. |
| 6,021,034 A | 2/2000 | Chan et al. |
| 6,026,605 A | 2/2000 | Tippett |
| 6,055,435 A | 4/2000 | Smith et al. |
| 6,087,588 A | 7/2000 | Soules |
| 6,396,391 B1 | 5/2002 | Binder |
| 6,423,900 B1 | 7/2002 | Soules |
| 6,518,724 B2 | 2/2003 | Janik |
| 6,805,469 B1 | 10/2004 | Barton |
| 6,853,939 B2 | 2/2005 | Coffeen |
| 6,864,798 B2 | 3/2005 | Janik |
| 6,867,558 B2 | 3/2005 | Gaus et al. |
| 6,993,289 B2 | 1/2006 | Janik |
| 7,057,401 B2 | 6/2006 | Blades |
| 7,082,541 B2 | 7/2006 | Hammond et al. |
| 7,118,235 B2 | 10/2006 | Barton |
| 7,146,288 B1* | 12/2006 | Welch ............................ 702/179 |
| 7,206,670 B2* | 4/2007 | Pimputkar et al. ............ 700/291 |
| 7,208,839 B2 | 4/2007 | Roytelman |
| 7,253,732 B2 | 8/2007 | Osann |
| 7,276,915 B1 | 10/2007 | Euler et al. |
| 7,403,598 B2 | 7/2008 | Tyroler et al. |
| 7,483,524 B2 | 1/2009 | Binder |
| 7,549,785 B2 | 6/2009 | Faunce |
| 7,688,841 B2 | 3/2010 | Binder |
| 7,690,949 B2 | 4/2010 | Binder |
| 7,821,160 B1 | 10/2010 | Roosli et al. |
| 7,867,035 B2 | 1/2011 | Binder |
| 7,873,441 B2* | 1/2011 | Synesiou et al. ............. 700/286 |
| 7,930,118 B2 | 4/2011 | Vinden et al. |
| 8,266,076 B2* | 9/2012 | Lopez et al. .................. 705/412 |
| 8,412,643 B2* | 4/2013 | Lopez et al. .................. 705/412 |
| 8,515,692 B2* | 8/2013 | Umekage et al. .............. 702/45 |
| 8,638,085 B2 | 1/2014 | Hilton et al. |
| 8,797,723 B2 | 8/2014 | Hilton et al. |
| 2002/0086567 A1 | 7/2002 | Cash |
| 2003/0028350 A1* | 2/2003 | Seem ............................ 702/179 |
| 2003/0225482 A1 | 12/2003 | Topka et al. |
| 2004/0015340 A1 | 1/2004 | Kadoi et al. |
| 2004/0131104 A1 | 7/2004 | Seferian |
| 2004/0142601 A1 | 7/2004 | Luu |
| 2004/0243377 A1 | 12/2004 | Roytelman |
| 2005/0184867 A1 | 8/2005 | Osann |
| 2005/0201190 A1 | 9/2005 | Kowalski |
| 2005/0275979 A1 | 12/2005 | Xu |
| 2006/0000971 A1 | 1/2006 | Jones et al. |
| 2006/0038672 A1 | 2/2006 | Schoettle |
| 2006/0072271 A1 | 4/2006 | Jones et al. |
| 2006/0072302 A1 | 4/2006 | Chien |
| 2006/0077614 A1 | 4/2006 | Bruccoleri et al. |
| 2006/0262462 A1 | 11/2006 | Barton |
| 2006/0267788 A1 | 11/2006 | Delany |
| 2007/0024264 A1 | 2/2007 | Lestician |
| 2007/0120978 A1 | 5/2007 | Jones et al. |
| 2007/0208535 A1 | 9/2007 | Misra et al. |
| 2007/0227867 A1 | 10/2007 | Yang |
| 2007/0228183 A1 | 10/2007 | Kennedy et al. |
| 2008/0012681 A1 | 1/2008 | Kadar et al. |
| 2008/0024605 A1 | 1/2008 | Osann |
| 2009/0009353 A1 | 1/2009 | Schoettle |
| 2009/0048901 A1 | 2/2009 | Richard et al. |
| 2009/0058193 A1 | 3/2009 | Reid et al. |
| 2009/0073641 A1 | 3/2009 | Ross |
| 2009/0228405 A1* | 9/2009 | Lopez et al. .................. 705/412 |
| 2009/0228406 A1* | 9/2009 | Lopez et al. .................. 705/412 |
| 2009/0322159 A1 | 12/2009 | Dubose et al. |
| 2010/0007655 A1* | 1/2010 | Agronin et al. ............... 705/412 |
| 2010/0084482 A1 | 4/2010 | Kennedy et al. |
| 2010/0198752 A1* | 8/2010 | Digon et al. .................. 705/412 |
| 2010/0328314 A1* | 12/2010 | Ellingham et al. ............ 705/412 |
| 2011/0260709 A1 | 10/2011 | Johnson et al. |
| 2012/0290230 A1* | 11/2012 | Berges Gonzalez et al. .. 702/61 |

FOREIGN PATENT DOCUMENTS

| | | |
|---|---|---|
| WO | 03085798 | 10/2003 |
| WO | 2005039016 | 4/2005 |
| WO | 200805225 | 5/2008 |
| WO | 2008052223 | 5/2008 |

OTHER PUBLICATIONS

International Search Report dated Nov. 14, 2015 issued in related International Patent Application No. PCT/US2011/060658.

Extended European Search Report dated Dec. 2, 2011 issued in related Patent Application No. 07863633.9-1232.

Extended European Search Report dated Nov. 24, 2011 issued in related Patent Application No. 07863631.3-1232.

Whitlock, "Understanding, Finding, and Eliminating Ground Loops," Class Manual Course Codes A14T and B50T, CEDIA Expo 2003.

International Search Report and Written Opinion dated Feb. 23, 2010 issued in related International Patent Application No. PCT/US2009/056268.

International Search Report and Written Opinion dated Sep. 15, 2009 issued in related International Patent Application No. PCT/US2009/051581.

International Search Report and Written Opinion dated Jul. 6, 2009 issued in related International Patent Application No. PCT/US2009/043390.

International Search Report and Written Opinion dated May 5, 2008 issued in related International Patent Application No. PCT/US07/82909.

International Search Report and Written Opinion dated Apr. 30, 2008 issued in related International Patent Application No. PCT/US07/82912.

* cited by examiner

MAINTAINING INFORMATION INTEGRITY WHILE MINIMIZING NETWORK UTILIZATION OF ACCUMULATED DATA IN A DISTRIBUTED NETWORK

CROSS-REFERENCE TO RELATED APPLICATIONS

This application is a continuation of International Application Number PCT/US2011/060658 filed Nov. 14, 2011, which claims the benefit of U.S. Provisional Application Ser. No. 61/413,134, filed on Nov. 12, 2010, the teachings of which are incorporated herein by reference.

FIELD OF THE INVENTION

The present disclosure relates to methods, systems and algorithms for gathering information, or data, which may be collected and accumulated on at least one of a plurality of measuring nodes and transferred to a controller node. In particular, contemplated herein is a method and system that may collect resource consumption data over a distributed network of sensors and generate and/or accumulate statistics from the distributed network.

BACKGROUND

Distributed sensor networks may have a number of applications in various fields, including examples such as area monitoring of a battlefield; environmental monitoring for permafrost or water temperature; as well as industrial monitoring of waste or ground water. One application, in particular, may include monitoring energy consumption in one or more buildings. However, sensor networks, such as the networks described above, may have a limited available bandwidth and limited available energy to transmit data packets at each node. Thus it may be desirable to optimize inter-node communication to reduce overall energy use and to minimize network traffic.

SUMMARY

An aspect of the present disclosure relates to a method for gathering information regarding usage of a resource from at least one of a plurality of measuring nodes operatively coupled to a controller, wherein the measuring node includes at least one sensor and a node processor operatively coupled to the sensor and the controller includes a controller processor. The method may include predicting an estimated resource usage value associated with the at least one sensor with the node processor, wherein the node processor uses a predictor algorithm and a dataset, wherein the dataset comprises data which are available at both the measuring node and the controller. The method may also include predicting the estimated resource usage value with the controller, wherein the controller uses the predictor algorithm and the dataset to arrive at the estimated resource usage value. The method may also include measuring resource usage to which the estimated resource usage value applies with the sensor and calculating a difference between the estimated resource usage value and the measured resource usage using the node processor and if the difference falls outside of a bound communicating the measured resource usage to said controller.

The present disclosure also relates to a system for gathering information regarding usage of a resource from a plurality of measuring nodes. The system may include a plurality of measuring nodes, wherein each of the measuring nodes includes at least one sensor configured to measure resource usage and a node processor operatively coupled to the sensor. The node processor may be configured to predict an estimated resource usage value associated with the at least one sensor using a predictor algorithm and a dataset, wherein the dataset comprises data which is available at both the measuring node and the controller, measure resource usage to which the estimated resource usage value applies with the sensor, and calculate a difference between the estimated resource usage value and the measured resource usage using the node processor and if the difference falls outside of a bound communicating the measured resource usage and any other data necessary for the controller to continue the predictor algorithm to the controller. The system may also include a controller operatively coupled to the plurality of measuring nodes wherein the controller includes a controller processor. The controller processor may be configured to predict the estimated resource usage value, wherein the controller uses the predictor algorithm and the dataset to arrive at the estimated resource usage value.

The present disclosure further relates to a system comprising one or more storage mediums having stored thereon, individually or in combination, instructions that when executed by one or more processors result in a number of operations. The operations may include predicting an estimated resource usage value associated with at least one sensor operatively coupled to a measuring node using a node processor, wherein the node processor uses a predictor algorithm and a dataset, wherein the dataset comprises data which is available at both the measuring node and a controller. The operations may also include predicting the estimated resource usage value separately with the controller, wherein the controller uses the algorithm and the dataset to arrive at the estimated resource usage value. The operations may further include measuring resource usage to which the estimated resource usage value applies with the sensor and calculating a difference between the estimated resource usage value and the measured resource usage using the node processor and if the difference falls outside of a bound communicating the measured resource usage and any other data necessary for the controller to continue the predictor algorithm to the controller.

BRIEF DESCRIPTION OF THE DRAWINGS

The above-mentioned and other features of this disclosure, and the manner of attaining them, may become more apparent and better understood by reference to the following description of embodiments described herein taken in conjunction with the accompanying drawings, wherein.

DETAILED DESCRIPTION

The present disclosure contemplates a system including a collection of one or more nodes (measuring or metering nodes) which may measure and accumulate data regarding the use of a resource or a parameter pertaining to resource use, (e.g. energy, volt amps, water, gas, oil, etc.) and a second node (consumer or controller node) where the information may be collected or aggregated for reference. Resources may be understood herein as electricity, water, or fuel including natural gas, oil, propane, wood pellets, feed stock, food, etc. Resource usage may be understood as the consumption or use of an available resource by a resource consuming device, such as an appliance, a furnace, etc. The information available on the controller node may, with reasonable accuracy and currency, correlate with actual information detected by the measuring node. The nodes associated with a system may be located throughout one or more buildings over a campus, wherein the buildings may be proximally located, or throughout one or more buildings located across one or more states or one or more countries. The measuring nodes may also be associated with other facilities, including storage tanks, silos, pipelines, supply lines, burners, engines, etc.

Figure 1A:
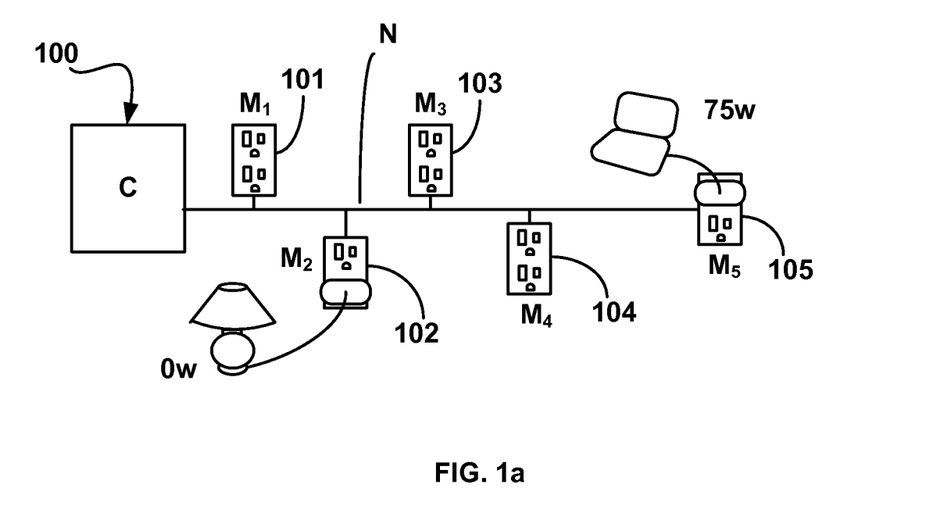
FIG. 1a illustrates an example of a plurality of measuring nodes operatively coupled to a controller over a power circuit in a residence. The measuring nodes are also individually operatively coupled to outlets, wherein resource consuming devices are plugged into the outlets and drawing different loads.
Figure 1B:
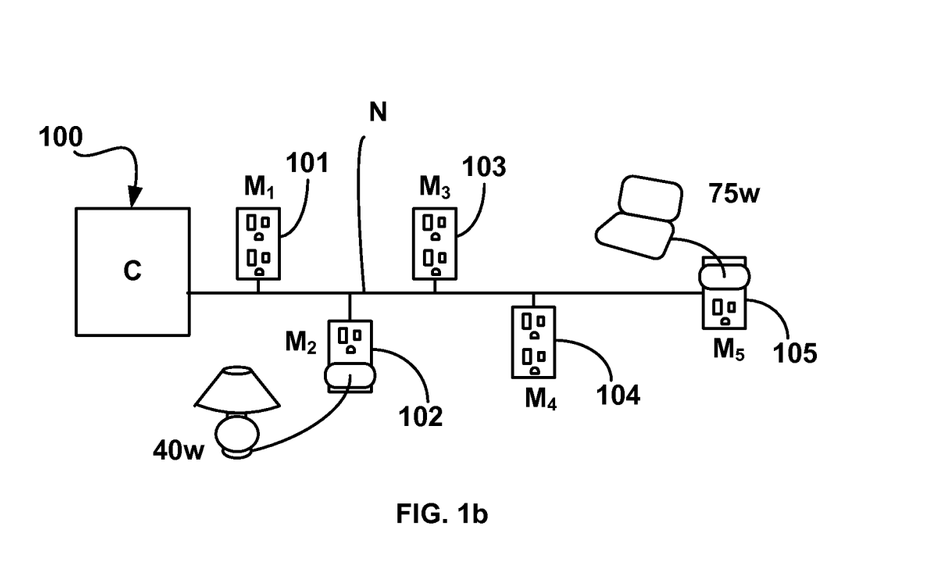
FIG. 1b illustrates the example of FIG. 1a, wherein different loads are being drawn by the resource consuming devices plugged into the outlets.

The nodes may be present in a system including a communication network, an example of which is as illustrated in FIGS. 1a and 1b. As alluded to above, the system 100 may include at least one controller (C) or consumer node, referred to herein as a controller, and at least one metering or measuring node, referred to herein as a measuring node, (Mx, where x in this example represents measuring nodes 1 to 5), which may be operatively coupled together via the communication network (N). A communication network N may include, for example, power supply lines or an electrical network, a computer network, a telecommunications network, a radio network, an optical network, etc.

The measuring nodes may also be operatively coupled to dual receptacle outlets 101, 102, 103, 104 to 105; however, it may be appreciated that the measuring nodes may be connected to other resource consuming devices, resource supply lines, resource storage devices or resource generating devices, such as switches, appliances, furnaces, generators, gas lines, water lines, water tanks, oil tanks, propane tanks, silos, solar panels, generators, etc. Various loads may be applied to the outlets 101 to 105, such as a light plugged into (or operatively coupled to) outlet 102 and laptop plugged into to outlet 105 as illustrated. The resource consuming devices, supply lines or storage devices may be residential, business or industrial scale.

As understood herein operative coupling may refer to an electrical, mechanical and/or wireless connection providing communication as between two or more objects or devices, either directly or indirectly. In non-limiting examples, operative coupling may be provided by electrical wiring, circuitry, magnetic induced effects, optical interaction, mechanical or physical contact, etc. Operativel coupling may occur indirectly, for example, over a bus or network. For example, the measuring nodes Mx may communicate with the controller C over power lines using power line communication protocols, wirelessly using e.g., radio frequency or optically using e.g., infrared, as well as through local area networks or wide area networks.

A measuring node may be directly or indirectly operatively coupled to each receptacle of the outlets or switches or a single measuring node may be coupled to an entire outlet bank or switch bank, including two, three or more outlets or switches. For example, the measuring node may be physically located within, or at least partially within, the resource consuming device, supply line, storage device, or generating device. Or, the measuring node may also be located within a junction box proximal to the resource device. Therefore, in embodiments, operatively coupling of the measuring node may be understood as positioning a sensor associated with the node in such a way that resource usage relative to the node may be measured directly or indirect.

FIG. 1a illustrates a first example, wherein the light plugged into outlet 102 is not drawing power and the laptop plugged into outlet 105 is drawing 75 W. FIG. 1b illustrates the system of FIG. 1a, wherein after a period of time, the light is turned on resulting in a power draw of 40 W and the laptop remains on drawing 75 W. The measuring nodes may provide to the controller data regarding the resource usage, such as changes in resource usage, rate of resource usage, etc. to the controller, as illustrated between FIGS. 1a and 1b.

Data may be understood herein as numbers, text, images or sounds in a form suitable for storage in and/or processing by components that may be found in the measuring node, controller, computers, etc. The data may represent information regarding or relating to, for example, energy, fuel consumption, water consumption, etc. Data may include or pertain to, for example, measured resource usage, time rate of resource use, estimated resource usage values, probable resource usage, bounds, etc or parameters utilized to determine the foregoing. Data may also include information indicating types or versions of algorithms, software, firmware, hardware, etc. A dataset may be understood to include one or more pieces or portions of data.

Figure 2:
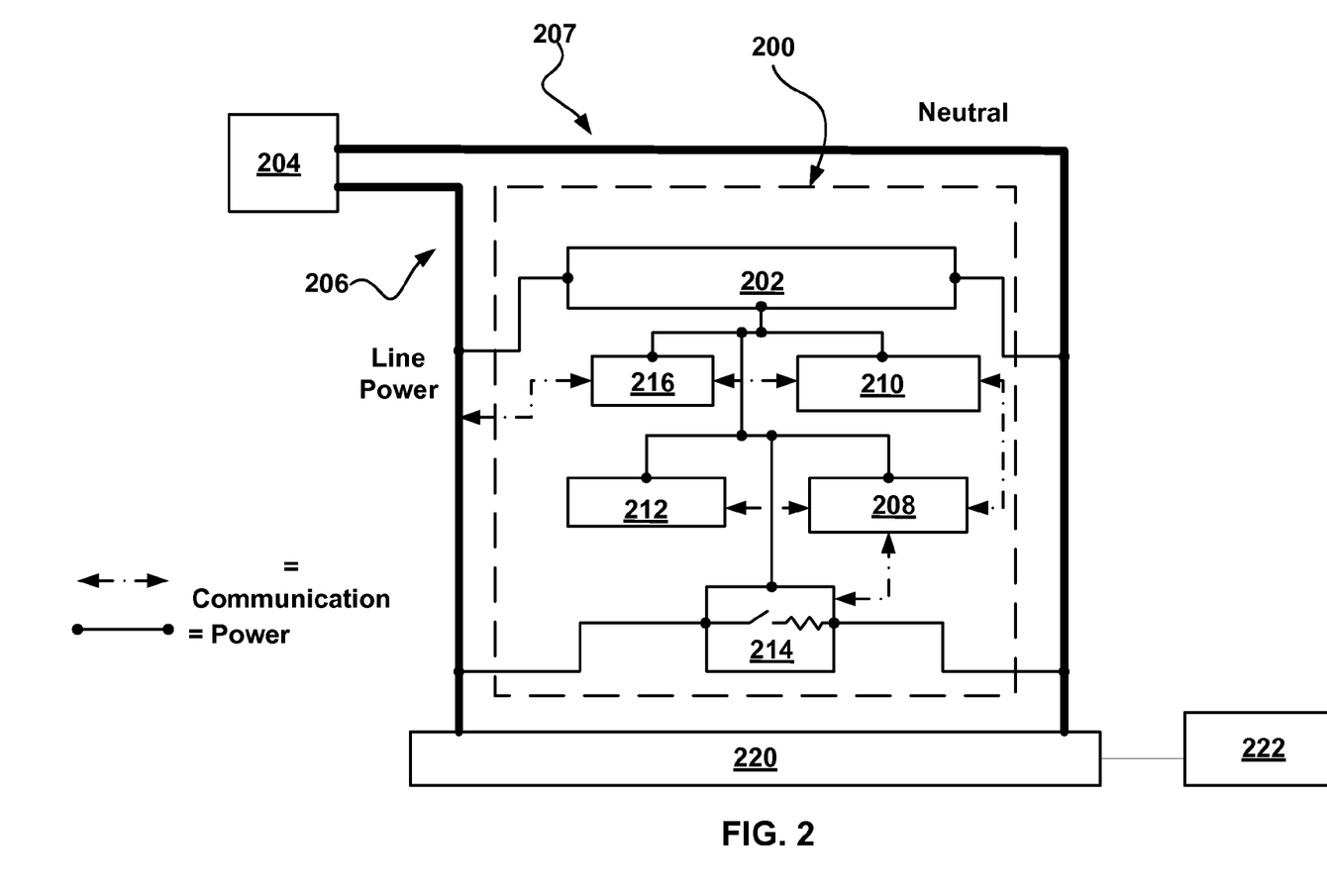
FIG. 2 illustrates an example of a measuring node, which may be directly or indirectly connected to a power source (such a circuit breaker) via a circuit and associated with a receptacle. A resource consuming device may be coupled to the receptacle.

FIG. 2 illustrates an example of a measuring node 200. A measuring node 200 may include a power supply 202, a processor 208, a communications function 210, a sensor 212, and a coupler 216, which enables communication to take place on the power lines or another type of communication network. In addition, the measuring node may optionally include a switchable micro-load 214. The measuring node 200 may be operatively coupled to the power supply via line power 206 and 207, which may be wired to an outlet 220. A resource drawing device 222 may be plugged into (or operatively coupled to) the outlet 220, thus operatively coupling the measuring node 200 to the resource drawing device 222, such as a lamp or dryer.

The power supply may draw power from a power source 204 though power line 206 with a return path for the current, neutral line 207. The power supply may be a low voltage power supply (e.g. less than 30 volts), and may be configured to transform the power from AC to DC, and reduce the voltage to a level acceptable for the processor, the switchable micro-load and communication functions. In addition, the power supply may include a battery, which may be charged with energy available between line power 206 and neutral 207. A processor is illustrated at 208 for controlling the actions of the unit based on logic inputs. The processor may also include arithmetic elements, as well as volatile and/or non-volatile memory. In addition, the processor may include identifier information for identifying the node, such as a serial number stored in the controller or measuring node. In embodiments, the processor may include a microcontroller.

A communications function 210 may also be provided. The communication function may be provided on the processor or micro-controller as input and output interfaces. The communication function may create and receive node electronic signals which may be interpreted by the various electronics within the node, other nodes or in a central processor (controller) with which the node may communicate. Signals received by the node may be filtered from and to the power line by a coupler 216. The coupler 216 may allow for one or more communication signals to be sent over the power line 206 and may utilize existing communication standards. In other embodiments, the communications function 210 may include a transmitter, a receiver or a transceiver configured to provide radio frequency or optical communications wirelessly. In further embodiments, as alluded to above, the communications function 210 may provide electrical communications over a local area network.

One or more sensors 212, which may include devices that measure key aspects of power (current, voltage, phase . . . etc.) or another resource such as gas flow, water flow, oil flow, propane flow, etc., may also be operatively coupled to the microcontroller such as by integration into the microcontroller or via communication therewith. In one example, a sensor 212 may measure the magnetic field generated by current and/or the voltage across the node 200 over the power line 206 and to the receptacle 220. Such sensors may include Hall effect sensors, current transformers, Rogowski coils, etc. In another example, the sensor may be a meter, such as a flow meter, configured to measure the flow of gas or water through a supply line. In yet a further example, the sensor may be a gauge, such as a gauge configured to measure the level or pressure of other resources that may be held in a tank or other storage device. It may be appreciated that resource usage may not be measured directly and indirect methods of measurement may be employed.

As noted above, a switchable "micro-load" 214 may be optionally included. The switchable "micro-load" may create a detectable resource consumption event. The micro-load may be activated when directed by the microcontroller, such as during reporting to a controller or inquiring information from a measuring node. The powered micro-controller may direct the switchable micro-load to trigger, providing a signal over, for example, a powerline where power line communication (PLC) is employed.

In addition to the above, the measuring node electronics may also include a number of other functions. For example, the electronics may include a temperature sensor (or other environmental sensors). Furthermore, the electronics may also provide user-detectable signals, such as audio or optical signals for alerting a user to the physical location of the node. In addition, memory, one or more multiplexers, one or more clocks or timers, one or more transformers or converters (analog to digital or digital to analog), and/or one or more logic inputs or outputs may be provided.

Figure 3:
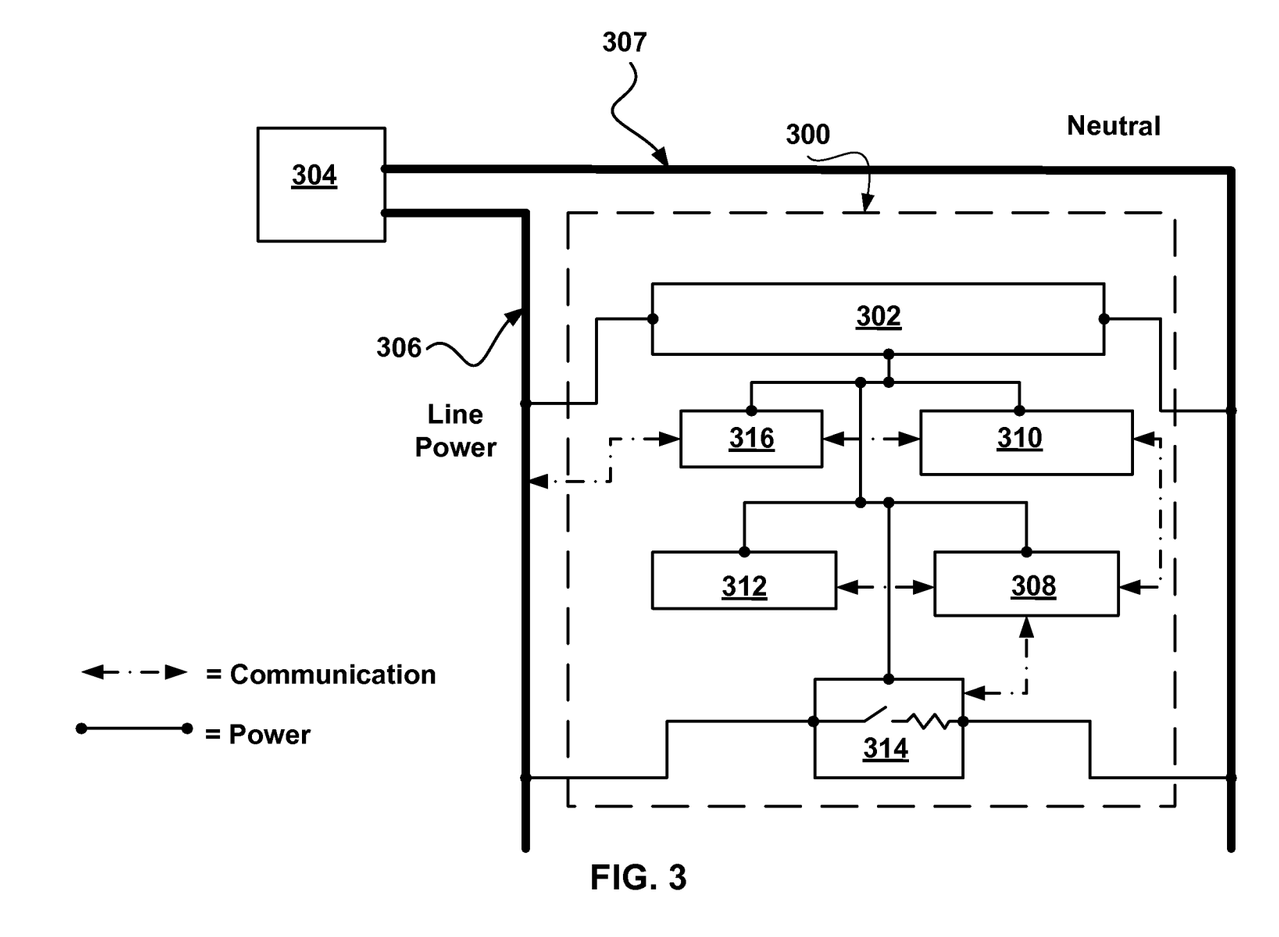
FIG. 3 illustrates an example of a controller, which may include similar components as a measuring node.

The controller or controller node may include similar components as that of the measuring node. For example, as illustrated in FIG. 3, the controller may also include a power supply 302, a processor such as a microcontroller 308, a communications function 310, a sensor 312, and a coupler 316, as well as an optional micro-load 314, as described above. The controller may be located locally, i.e., within the buildings or campus being monitored or remotely at a location apart from the campus or buildings where the measuring nodes are located.

As alluded to above, the measuring nodes may provide information regarding resource usage to the controller. One method to gather this information may be through polling. Polling may be understood as periodically requesting an update of each measuring node regarding resource use at that measuring node. The interval between updates determines the maximum latency of the information gathered. For example with 1000 measuring nodes and a desire to keep the latency below 1 minute, each node would have to send data once a minute, for a total of 1000 updates per minute. With X measuring nodes, (X representing the number of measuring nodes) the demand on the network may be proportional to X, and inversely proportional to the latency time ($T_1$). This approach may not scale well if the network bandwidth remains constant as the number of measuring nodes increases. If the rate of resource usage being measured by one node changes, the average latency before the controller node will be notified of the change, may be determined by Equation 1.

$$\text{Average Latency} = (Tc*X)/2 \qquad \text{Eq. 1}$$

wherein, Tc is the time to communicate one node's data to the controller C. Since this latency may be at least partially dependent on the number of nodes in a network, the latency may increase as the network grows, even if the number of changes in the rate of resource usage is small.

The collected information of particular interest may include data that shows a change in a rate at which a given resource is being used. "Interesting" information may include unpredicted changes in resource usage. In many situations the amount of resource used may be relatively predictable over a short timescale, relative to the measured parameter. For example, an outlet with no power being drawn from it will be highly likely to have no power being drawn from it a relatively short time later, such as a few seconds or minutes later. A light drawing 60 W will be highly likely to continue consuming 60 W over a few seconds or minutes. A furnace that is consuming oil at 4 gallons per hour will be highly likely to consume 4 gallons per hour a relatively short time later, such as a few seconds later. Embodiments of the methods and systems herein may leverage these observations to minimize both the network utilization and the energy expended by each node in reporting and accumulating data relative to resource usage.

For example, in a distributed network there may be a multitude of measuring nodes, Mx (x varying from 1 to X, the number of measuring nodes), operatively coupled with a data consumer or controller, C. Each measuring node Mx may contain at least the components required for sensing and measuring a resource usage (ex., energy, oil, gas, etc.), accumulating a total resource usage, determining a rate of resource usage, storing some number of data samples locally, and communicating the information back to C as discussed above. C may contain at least the components required to communicate with the multitude of measuring nodes Mx, store information, and some kind of external communication capability.

In one example, the controller C may be concerned with or programmed to maintain a relatively accurate and recent value of the total resource usage (e.g., kWh) at each node, reported in widely spaced, discrete increments (i.e. >10 minutes). This shall be referred to as case A. C may also be interested in or programmed to determine shorter time resolution (i.e. <1 second) of resource consumption data for other purposes like safety, demand response, etc. This shall be referred to as case B.

Accordingly, one example for collection of usage data would be to setup a polling process for information on usage from the network. In this case the controller may ask each node individually for results, or set up a schedule on which each node has a time-slot in which to report results (Time Domain Multiple Access). This standard approach, which may be fundamentally easy to implement, may not always be desirable for a few reasons:

1. The maximum plausible update rate, $f_{ur}$, is inversely proportional to the number of nodes X, as represented in Equation 2.

$$f_{ur} \propto \frac{1}{X} \qquad \text{Eq. 2)}$$

If the required update rate and size of data packet is fixed, and the number of nodes is increased, then the communication protocol may be scaled and designed to operate at a relatively fast effective data rate in order to cope with large networks. As the network speed increases, so does the overall cost of implementation and use of the network. The increasing update rate may be of particular concern in case B, where the network may be interested in short-time scale power consumption events.

2. In some cases, there may be some number of nodes for which the averaged rate of resource usage has not changed significantly since the last update (i.e., the rate of total energy consumption has not increased/decreased significantly for that node). Combined with (1), this means that the network communication performance may be required to be far more capable than is actually necessary. As a result, this may lead to relatively more expensive/complex/power hungry communication protocols than may be actually required.

3. Additionally, because of (2), some set of nodes within X may implicitly communicate resource usage data even though it is not necessary, i.e. an unnecessarily relatively large number of transmission events may take place. This may cost increase the cost of the network in terms of implementation and utilization.

Accordingly, provided herein are methodologies, systems and algorithms for dynamic reporting of resource usage data between the multitude of measuring nodes Mx and at least one controller C. One such system may include a distributed algorithmic decision making process. The process may be recorded on a tangible storage medium and stored on and/or executed by a processor provided in a computer, a controller node, a measuring node or a combination thereof.

In embodiments, a given measuring node Mx and controller C may independently calculate and predict an estimated resource usage value associated with a given sensor operatively coupled to the measuring node. The predictor algorithms used by the measuring node Mx and controller C may be the same. In addition, the dataset used in predictions by the measuring node Mx and the controller C may be the same. The measuring node Mx may then measure the resource usage and the predicted estimates may be periodically adjusted.

As alluded to above, the sensor may include devices that may measure aspects of the resource usage, such as current, voltage, tank level, pressure, etc. and the resource usage may be determined from these measured aspects. A difference between the estimated resource usage value and the measured resource usage may then be calculated by the measuring node processor. If the difference falls outside of a bound, e.g., exceeds a limit or threshold, data regarding resource usage, and other data necessary to continue making predictions, may be communicated to the controller. If the difference remains within the bound, the measuring node will refrain from communicating the data regarding resource usage.

If the data provided by the measuring node regarding resource usage is indeed received by the controller, the controller may provide a notification to the measuring node that the data has been received. The measuring node and controller may then use the shared dataset, or data available at both the measuring node and controller, in making further predictions.

The method may be repeated periodically, such as at a given time interval. For example, in embodiments, the interval may be every line cycle or a clock cycle. For a line cycle, this means that the measuring node may measure or accumulate energy usage for a time period, which may be some integer multiple of rising zero crossings of line voltage, e.g. 1/60 of a second or 1/50 of a second. In embodiments, the interval may be 1 microsecond or greater, such as in the range of 1 microsecond to annually, including all values and ranges therein. The estimated and measured resource usage may be quantified in terms of a rate, such as the total resource usage over a given time period. In embodiments, only the number related to the measured resource usage itself is communicated, not the calculated difference between the estimated and measured resource usage. Further, the measured resource usage that may be communicated to the controller may include rate of resource usage, the accumulated or total resource usage or both.

Figure 4A:
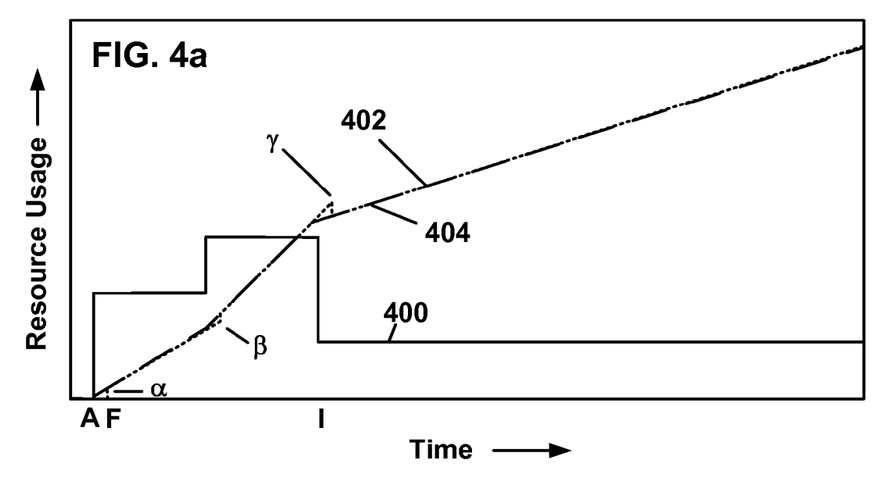
FIGS. 4a, 4b and 4c illustrates an example of a timing diagram of a dynamic reporting process with respect to an example of energy use for a particular load, wherein the time scale on the figures is the same.
Figure 4B:
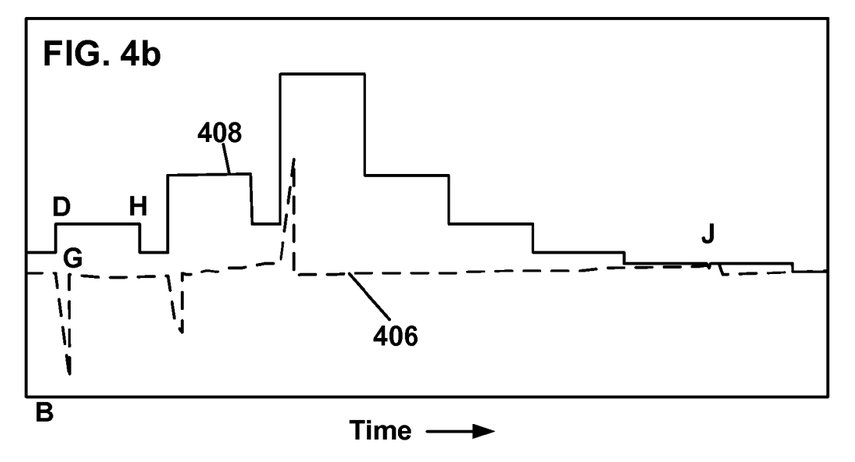
Figure 4C:
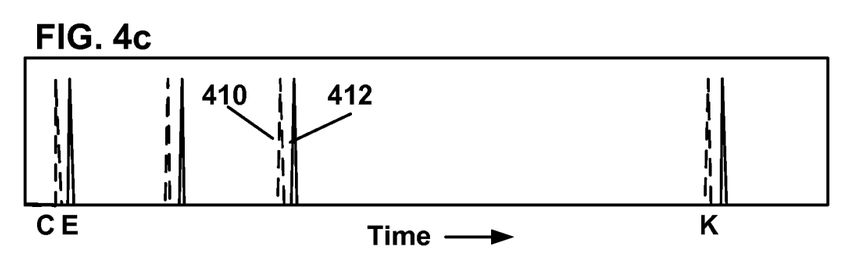

FIG. 4a illustrates a graph of rate of resource usage (e.g., power draw) 400, estimated resource usage 402 as calculated by the controller and measured resource usage 404 over time. FIG. 4b illustrates a graph of the calculated difference between the estimated resource usage 406 and the bound 408 over time (wherein the time scale is the same as in FIG. 4a). The bound may be fixed, or as illustrated adjusted over time using a bound algorithm. The bound may include an upper limit and a lower limit, wherein the upper and lower limits may exhibit the same, similar or different magnitudes. FIG. 4c illustrates a graph of reporting events by the measuring node to the controller, wherein the measured resource usage is reported or sent to the controller 410. The lag time between the reporting by the measuring node and the time in which the controller updates its prediction 412 of the estimated resource usage is also illustrated.

As alluded to above, in embodiments, the bound may be a magnitude or a fixed number or calculated using a bound algorithm. For example, when the bound is a fixed number, if the difference between the estimated resource usage value and the measured resource usage is more than the fixed value, the measured resource usage at the measuring node may be communicated to the controller. If the difference is less than the fixed value, the measuring node will not send the measured resource usage to the controller.

The bound may also be related to the rate of resource usage. For example, if the difference between the estimated resource usage and the measured resource usage is more than the rate of resource usage multiplied by a fixed time, then a message may be sent to the controller and the measured resource usage may be communicated to the controller.

The bound may also be varied with time, and in particular, how much time has past since the last message was sent. For example, if the difference between the estimated resource usage value and the measured value is more than a fixed rate of resource usage multiplied by the time since the last usage, then the measured resource usage may be communicated to the controller.

In addition, the bound may be varied when the difference falls outside of the bound and a communication is sent to the controller, the bound may then be increased by a factor, such as a factor of greater than 1, such as in the range of 1.01 to 10.00.

Further, the bound may be calculated such that it varies with time. For example, the bound algorithm may set the bound to an initial value. If a message has not been sent after a certain time period has lapsed, the reducing time, the bound may be multiplied by a first factor, which is less than 1, for example 0.5, reducing the bound. This may continue until the difference of the estimated resource usage and the measured resource usage falls outside of or exceeds the bound.

Once the difference falls outside of the bound, a message may be sent including data allowing the controller to determine what the bound was at the time of the communication, the rate of resource usage, whether any prior communications were not received by the controller and the measured resource usage. The bound may then be multiplied by a second factor, greater than 1, such as 2. Therefore, the average rate of sending messages or communications to the controller may be determined by the reducing time and the factor applied. For example, if the reducing time is one minute and the first factor is 0.5 and the second factor is 2, then messages will be sent at an average rate of one per minute. A minimum bound may also be set, so that nuisance messages may be avoided for insignificant errors reducing the overall average rate at which messages may be sent.

In embodiments, the bound may be determined using one or a combination of the above algorithms.

From the above, it may become apparent that the frequency of reporting events (i.e., transmission or communication events) may be adjusted by adjusting the reducing time and factors by which the bound may be multiplied. For example, as alluded to above, by reducing the reducing time, i.e., the amount of time which passes before the bound is multiplied by a factor of less than 1, the frequency of reporting events may increase. Further, increasing the factor by which the bound may be multiplied after the measured deviation in resource usage falls outside the bound may reduce the frequency in reporting time, wherein the factor may be greater than 1. Adjustments in reducing time and the factors allow for the ability to tune the algorithms related to specific measuring nodes, and thereby sensors, to adjust the frequency in which the measuring nodes communicate with the controller C.

The controller, utilizing the bound algorithm utilized by the node processor, may also calculate a range of probable measured resource usage values. For example, if a fixed bound is set, the controller may indicate that the range of probable measured resource values fall at the estimated predicted resource usage value plus or minus the fixed bound value.

In addition, the controller may change aspects of the bound algorithm stored at the node processor and controller processor, including the reducing time, the factors, the minimum bound, set a fixed value, or all of the above, to tune the average rate of data communicated from a measuring node, prioritizing information received regarding individual resources. Given the above, relatively small errors may eventually be reported whereas larger errors may be tolerated for shorter periods of time. If the rate of usage changes substantially then a message may be sent quickly. Further, if resource usage rates change frequently, the algorithm may desensitize itself to these changes and send messages about changes which are notable in view of the usage characteristics.

It is also noted that the failure of a particular message to be delivered does not "break" the algorithm, but may degrade the short term accuracy and latency of the information that the controller has and similarly degrade the estimated resource usage data predicted by the controller. Thus, the controller may provide a relatively good estimate at any point in time about resource usage, the latency of that information and the difference between that information and the measured resource usage.

For illustration, if the nodes are measuring energy, each node Mx may be configured to operate in line-cycle based energy accumulation mode. This means that the measuring node may measure or accumulate energy usage for a time period, which may be some integer multiple of rising zero crossings of line voltage, e.g. 1/60th of a second.

A set of rules i.e., a predictor algorithm and a bound algorithm, may be provided in memory or in another medium and stored and/or executed by the processors included in the measuring nodes Mx and controller C regarding energy data and when to report it or when it is reported. Controller C may still obtain a relatively accurate total energy consumption figure from each node Mx while avoiding the necessity of a static reporting structure and may also gain the ability to resolve shorter time-scale events.

For an example of a set of rules, the following variables are defined:

| Symbol | Name | Definition |
| --- | --- | --- |
| n | Current cycle | Line cycle count |
| Eest[n] | Estimated Energy | Calculated Estimate of total energy used up to cycle n |
| Em[n] | Total Energy | Measured total energy used up to cycle n |
| Edev[n] | Error Energy | Difference between Eest and Em at cycle n |
| Eb | Error Bound | Value for Edev that will cause a data transmission |
| Ecyc[n] | Cycle Energy | Energy accumulated in line cycle n |
| Ntrans | Last transmission event cycle number | n when last data transmission sent |

In the energy measurement and calculation processes of a measuring node Mx the total energy may be determined as set forth in Equation 3 below.

$$Em[n]=Em[n-1]+Ecyc[n], \quad \text{Eq. 3)}$$

where n is a given line cycle and Ecyc[n] is defined as the energy accumulated over a single line cycle. This process may be consistent across all line-cycle accumulation based energy measurement.

A predicted or estimated energy may then be calculated at each line cycle as illustrated in Equation 4 below.

$$Eest[n]=Eest[n-1]+Ecyc[Ntrans] \quad \text{Eq. 4)}$$

Additionally, an energy deviation or error may be calculated as set forth in Equation 5 below.

$$Edev[n]=Eest[n]-Em[n] \quad \text{Eq. 5)}$$

Upon completion of a line-cycle accumulation event and acquisition of the Ecyc[n] sample, equations Eq. 3, Eq. 4 and Eq. 5 may be re-calculated, repeating the calculations every line cycle.

The next step may include determining if conditions for a transmit event are met, i.e., whether the node should send a message to the controller C. For example, an update at line cycle n may be transmitted if there is reason to believe that Edev[n] may be outside of the bound Eb. In an embodiment, Edev[n] may be compared against the positive and negative limit. If the Edev[n] is above the positive or negative bound, communication may occur. Determining if Edev[n] is outside of bound Eb, may include indirect methods, such as seeing that the current has changed.

If conditions for a transmit event are met, data may be sent to the controller C to update the prediction algorithm. The data may include one or more of the following: n, Em[n], Ecyc[n], Edev[n] and Eb or combinations thereof. Once such update is acknowledged by the controller, or other such stipulations for a transmit event have been met, Ntrans may be updated to the n at which it was transmitted. Once the measuring node receives the controller's acknowledgement of the data packet, the measuring node may then adjust its prediction as well using the same dataset available at the controller C, so that the prediction made on the measuring node may be the same as the prediction made on the controller. This may be accomplished by the node adjusting its prediction upon receipt of the acknowledgement such that Eest[n]=Eest[Ntrans]+(n−Ntrans)*Ecyc[Ntrans].

The bound Eb may be adjusted by the measuring node, the controller or both. In embodiments, the measuring node may adjust the bound algorithmically whenever a data packet generated by the bound or bound algorithm is sent to the controller C and then acknowledged. In embodiments where the controller is configured to calculate the expected value of the bound, it does so using the same parameters as the node, i.e., using the same bound algorithm and data set.

As previously noted, the measuring node may also reduce the bound over time (possibly subject to some limits) to guarantee the resolution of the information communicated to the controller over a long interval of time. The controller may also communicate to the measuring node a change in the parameters of the bound algorithm, which would then be utilized by the measuring node and increase and/or decrease the rate of the data packets being generated or collected. In this way, the overall utilization of the network may be throttled. For example, when a reducing time is raised for a given measuring node, fewer events may be generated over any given interval of time, and therefore the network utilization may be lower for that measuring node.

Reference is again made to FIGS. 4a, 4b and 4c. At point "A" the power draw increases, accompanied by a rise in the measured energy usage 404. However, a deviation is created between the predicted estimated energy usage 402 and the measured energy usage 404. At point "B", the difference 406 between the accumulated energy 404 and predicted energy usage 402 increases outside of the bound value 408, causing a transmit event or communication to occur between the measuring node and controller at point "C". The measuring node may report the changes in power draw, the accumulated energy and/or the bound crossing to the controller when the bound crossing occurs.

The measuring node may increase the bound by a factor, such as a factor of two, at point "D." At point "E" the controller acknowledges that the update is received and at about the same time, the controller at point "F" revises the prediction of energy usage. In addition, once the controller confirms the receipt of the update, the measuring node may begin using the transmitted data regarding resource usage in its own prediction of estimated energy usage. Then the measuring node and/or controller "reset" the deviation at "G" that accumulated prior to the update and a difference is calculated utilizing the new bound. After the passage of some amount of time without a transmit event, which may be a predetermined amount of time (the reducing time), the controller may revise the bound by multiplying the bound by a factor of less than 1, at point "H". As can be seen, the measured accumulated energy 404 and the predicted energy usage 402 may track closely, with differences visible at e.g., points "α", where the power draw rises, and "β" where the power draw changes and increases, and "γ" where the power draw changes and decreases.

After point "I", when power draw is reduced and remains relatively constant, the bound may be reduced by a factor of less than 1 after a reducing time. This reduction in the bound may occur multiple times until the difference between the measured energy usage and the predicted estimated energy usage falls outside of bound "J" and a reporting event is triggered at point "K". The prediction calculations may then again be adjusted and the bound may optionally be increased by a factor of greater than 1.

Any of the operations described herein may be implemented in a system that includes one or more tangible machine-readable storage mediums having stored thereon, individually or in combination instructions that when executed by one or more processors perform the methods. Here the processors may include, for example, a system CPU, other programmable circuitry or both. Also, it is intended that operations described herein may be distributed across a plurality of physical devices, such as processing structures at more than one different physical locations. The tangible computer-readable storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The computer may include any suitable processing platform, device or system, computing platform, device or system and may be implemented using any suitable combination of hardware and/or software. The instructions may include any suitable type of code and may be implemented using any suitable programming language. Other embodiments may be implemented as software modules executed by a programmable control device.

As used in any embodiment herein, the term "module" may refer to software, firmware and/or circuitry configured to perform the stated operations. The software may be embodied as a software package, code and/or instruction set or instructions, and "circuitry", as used in any embodiment herein, may comprise, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), etc.

The foregoing description of several methods and embodiments has been presented for purposes of illustration.

It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method for gathering information regarding usage of a resource from at least one of a plurality of measuring nodes operatively coupled to a controller through a communication network, wherein said measuring node includes at least one sensor and a node processor operatively coupled to said sensor, and said controller includes a controller processor, comprising:
predicting a first estimated resource usage associated with said at least one sensor with said node processor, wherein said node processor uses a predictor algorithm and a first dataset regarding said resource usage to predict said first estimate resource usage;
predicting a second estimated resource usage with said controller processor, wherein said controller processor uses said predictor algorithm and a second dataset, which is the same as said first dataset, to arrive at said second estimated resource usage, wherein said first and second estimated resource usages are the same;
measuring resource usage, to which said first and second estimated resource usages apply, with said sensor;
calculating a difference between said first estimated resource usage and said measured resource usage using said node processor; and
a) if said difference falls outside of a bound, communicating said measured resource usage to said controller, adjusting said first dataset with said node processor for making further predictions of said first estimated resource usage and adjusting said second dataset with said controller processor for making further predictions of said second estimated resource usage, such that said second dataset remains the same as said first dataset, and
b) if said difference remains within said bound, said measuring node refrains from communicating said measured resource usage to said controller.

2. The method of claim 1, wherein said bound is a fixed value.

3. The method of claim 1, wherein said bound is calculated using a bound algorithm.

4. The method of claim 3, wherein said bound algorithm is calculated separately by said controller processor.

5. The method of claim 4, further comprising calculating a range of probable resource usage values by said controller processor using said bound algorithm.

6. The method of claim 1, wherein said measuring node includes node memory and said method further comprises storing more than one measured resource usage in said node memory and communicating said more than one measured resource usage to said controller when said difference exceeds said bound.

7. The method of claim 1, wherein said method is repeated.

8. The method of claim 7, wherein said method is repeated every line cycle.

9. The method of claim 1, wherein said measuring node includes a plurality of sensors and said method is executed for more than one of said sensors.

10. The method of claim 1, wherein said bound changes with time.

11. A system for gathering information regarding usage of a resource from a plurality of measuring nodes, comprising:
a plurality of measuring nodes operatively coupled to a controller through a communication network, wherein each of said measuring nodes includes at least one sensor configured to measure resource usage and a node processor operatively coupled to said sensor, wherein said node processor is configured to
predict a first estimated resource usage associated with said at least one sensor using a predictor algorithm and a first dataset regarding said resource usage,
measure resource usage, to which said first estimated resource usage value applies, with said sensor, and
calculate a difference between said first estimated resource usage and said measured resource usage and
a) if said difference falls outside of a bound, communicate said measured resource usage to said controller and adjust said first dataset for making further predictions of said first estimated resource usage, and
b) if said difference remains within said bound, refraining from communicating said measured resource usage to said controller;
wherein said controller includes a controller processor, wherein said controller processor is configured to
predict a second estimated resource usage, wherein said controller uses said predictor algorithm and a second dataset, which is the same as said first dataset, to arrive at second estimated resource usage, wherein said first estimated resource usage and said second estimated resource usage are the same, and
adjust said second dataset for making further predictions of said second estimated resource usage if said node processor communicates said measured resource usage, such that said second dataset remains the same as said first dataset.

12. The system of claim 11, wherein each of said measuring nodes includes more than one sensor.

13. The system of claim 11, wherein said resource usage is selected from the group consisting of energy, fuel consumption and water consumption.

14. The system of claim 11, wherein said at least one sensor is operatively coupled to a resource consuming device.

15. The system of claim 11, wherein said at least one sensor is operatively coupled to a resource supply line.

16. The system of claim 11, wherein said at least one sensor is operatively coupled to a resource storage device.

17. The system of claim 11, wherein said at least one sensor is operatively coupled to a resource generating device.

18. The system of claim 11, wherein said sensor includes a device selected from the group consisting of Hall sensors, current transformers, and Rogowski coils.

19. The system of claim 11, wherein said sensor includes a device selected from the group consisting of a flow meter, a pressure gauge, and a level gauge.

20. A system comprising, one or more computer readable devices having stored thereon, individually or in combination, instructions that when executed by one or more processors result in the following operations comprising:
predicting a first estimated resource usage associated with at least one sensor operatively coupled to a measuring node using a node processor, wherein said node processor uses a predictor algorithm and a first dataset regarding said resource usage;
predicting a second estimated resource usage separately with a controller operatively coupled to said measuring node through a communication network, wherein said controller uses said predictor algorithm and a second dataset, which is the same as said first dataset, to arrive at said second estimated resource usage, wherein said first and second estimated resource usages are the same;

measuring resource usage, to which said first and second estimated resource usages apply, with said sensor;

calculating a difference between said first estimated resource usage value and said measured resource usage using said node processor, and a) if said difference falls outside of a bound, communicating said measured resource usage to said controller, adjusting said first dataset with said node controller for making further predictions of said first estimated resource usage, and adjusting said second dataset with said controller for making further predictions of said second estimated resource usage, such that said second dataset remains the same as said first dataset, and b) if said difference remains within said bound, said measuring node refrains from communicating said measured resource usage to said controller.

* * * * *